Oct. 9, 1945.                M. NAZZEWSKI                    2,386,628
                           GLASS-TO-METAL SEAL
                           Filed June 3, 1942
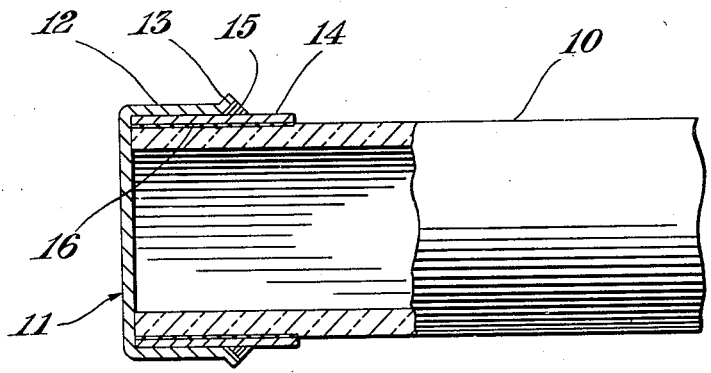
MATHEW NAZZEWSKI
       INVENTOR.
BY *Vernon M. Dorsey*
ATTORNEY Patented Oct. 9, 1945

2,386,628

UNITED STATES PATENT OFFICE 2,386,628

GLASS-TO-METAL SEAL

Mathew Nazzewski, Adams, Mass., assignor to Sprague Electric Company, North Adams, Mass., a corporation of Massachusetts Application June 3, 1942, Serial No. 445,609

3 Claims. (Cl. 49—92.5)

The present invention relates to improved glass-to-metal seals and to the manufacture of such seals.

The glass-to-metal seals of the present invention are particularly suitable for the hermetical sealing of electrical apparatus the components of which in operation undergo large temperature changes and important differential expansions. It should be well understood, however, that the invention is also applicable to other devices in which a hermetically tight seal is required between glass and metal members.

It is an object of the invention to provide a hermetically tight seal between a glass and a metal member, which seal permits substantial differential movement of the sealed members.

In accordance with the invention, the glass member and the metal member to be sealed thereto are hermetically united by an interposed layer of a metal which is sufficiently soft that it adjusts itself to the differential expansion of the glass and metal members to be sealed, and which at the same time forms an integral molecular bond with the members to be sealed. More particularly, the glass and metal members are sealed by an interlay of lead which under specific conditions, hereinafter to be more fully pointed out, chemically unites with the glass surface and forms an integral molecular bond therewith.

I am aware that it has heretofore been proposed to bond metal and glass members by interposing a common bonding layer between the members. However, the bonds formed by such prior methods either do not permit a wide-range differential movement of the bonded glass and metal members and even small internal stresses in these members disrupt such bond, or are not true bonds at all but the so-called bonding layer acts merely as a gasket interposed between the members whereby the tightness of the seal varies with time and in most instances is not hermetically tight even when newly formed.

The invention is particularly applicable when sealing metal members to boro-silicate glasses, such as "Electrical Pyrex," and the invention will be described with reference to such glasses.

In the drawing forming part of the specification, a cylindrical glass tube 10 constituting, for example, the casing of an electrical device, is sealed at one end by a closure cap member 11 having a flange 12 provided with an integral radially-extending lip 13. Cap 11 may consist, for example, of brass, bronze, "Monel" metal or the like.

For the sealing of the cap 11 to the casing 10 in accordance with the invention, there is interposed between the two a bonding interlay 14 to which the cap 11 is hermetically secured, for example by proper soldering as shown at 15.

In accordance with the invention the interlay consists of a metal coating which is applied to the casing 10 under conditions which bring about an integral molecular bond with the glass, whereby the interlay is adapted to adjust itself without rupture to differential movement between the cap and the casing. I have found that lead and certain lead alloys consisting preponderantly of lead, for example a lead-silver alloy containing 2.5% silver, meet the above requirements when applied to the surface of the glass under conditions which cause the lead or lead alloy, or at least selected portions thereof, to chemically unite with and/or mutually dissolve in the glass.

To effect such an integral molecular bond to form a true seal, the glass is heated to a temperature approximating the melting point of the lead (327° C.) or lead alloy. For example, in the case of the lead alloy above referred to, the glass is heated to a temperature of about 305° C., and the alloy is applied to the glass while the glass is maintained at this temperature. For reasons hereinafter pointed out, the alloy is applied to the casing 11 by spraying it in the form of molten particles, and such spraying preferably takes place in a slightly oxidizing atmosphere.

The exact manner in which such lead and/or lead-alloy layers become chemically bonded to the glass is not fully known to me. However, it appears that in spraying the lead metal there is formed on the molten particles a surface coating of lead oxide and this coating dissolves in and/or forms a complex lead glass with the heated glass, which is somewhat plastic at the above-mentioned temperature. This action appears to be particularly pronounced in the case of boro-silicate glasses, and the complex lead-boro-silicate glass which is formed exhibits unusually high bonding forces between the glass of the casing and the interlayer 14. This region of interfusion between the glass and the interlayer has been indicated in the drawing as a layer 16.

Merely heating the glass and bringing the heated glass in contact with lead, either molten or solid, does not produce a bond nor is a true bond formed when lead is sprayed on cold glass.

Whether lead per se or a preponderantly lead-alloy is used for forming the interlay 14 is determined by such factors as the maximum operating temperature of the glass-to-metal seal and the metal constituting the closure member 11. I have found, for example, that when using a cap 11 of "Monel" metal the soldering thereof to the interlay 14 is greatly facilitated by using the lead-silver alloy above mentioned.

While I have described my invention by means of specific examples and in a specific embodiment, I do not wish to be limited thereto, for obvious modifications will occur to those skilled in the art without departing from the spirit and scope of the invention.

What I claim is:

1. In combination, a glass member, a "Monel" metal member sealed thereto, an interlayer of a metal alloy consisting of about 97.5% lead and 2.5% silver interposed between the glass member and the metal member, and an interlayer of lead glass interposed between the glass member and the metal alloy interlayer and forming an integral molecular bond with the glass member, said metal alloy interlayer forming an integral molecular bond with the lead-glass interlayer and being intesoldered with the metal member.

2. In combination, a borosilicate glass member, a metal member having a different coefficient of expansion hermetically sealed thereto, interposed between said members and integrally bonded to the glass a layer of a metal consisting preponderantly of lead which is sufficiently soft that it adjusts itself without rupture to the differential expansion of said members, said interposed metal layer being hermetically joined to said metal member by means of solder.

3. In combination, a tubular borosilicate glass member, a tubular metal member having a different coefficient of expansion hermetically sealed thereto, interposed between said members and integrally bonded to the glass a layer of a metal comprising lead which is sufficiently soft that it adjusts itself without rupture to the differential expansion of said members, said interposed metal layer being hermetically joined to said metal member by means of solder.

MATHEW NAZZEWSKI.